United States Patent [19]

Chadwick

[11] 4,165,091
[45] Aug. 21, 1979

[54] SNOWBOARD

[76] Inventor: Daniel E. Chadwick, 43 Raymond Ave., Rutherford, N.J. 07070

[21] Appl. No.: 808,711

[22] Filed: Jun. 21, 1977

[51] Int. Cl.$^2$ ............................................. B62B 13/06
[52] U.S. Cl. ............................... 280/12 H; 280/21 R; 280/87.04 A
[58] Field of Search ................... 280/12 H, 7.12, 7.13, 280/16, 28, 87.04 A, 21 R

[56] References Cited
U.S. PATENT DOCUMENTS

| | | | |
|---|---|---|---|
| 1,830,514 | 11/1931 | Joslin | 280/7.13 |
| 2,617,659 | 11/1952 | Grenier | 280/21 R |
| 3,583,722 | 6/1971 | Jacobson | 280/28 |
| 4,043,565 | 8/1977 | Mogannam | 280/87.04 A |

Primary Examiner—Robert R. Song

[57] ABSTRACT

A snowboard for use on a snow laden surface comprising an elongated main body having laterally spaced skis or runners mounted to the underside of the body at the front and rear thereof. The laterally disposed runners are coupled together in order to maintain their parallel relation and therefore, the stability of the snowboard. Each runner may have a centrally disposed stabilizer fin on its bottom surface.

2 Claims, 8 Drawing Figures

SNOWBOARD

BACKGROUND OF THE INVENTION

The present invention relates to recreational devices and more particularly to a device for use in coasting or surfing over a snow surface.

During the past few years the sport of skiing and other winter sports such as surfboarding has increased in popularity. To meet the increased interest various types of devices capable of use in snow surfing have been developed. Typical prior art and related devices can be found in the following U.S. Pat. Nos.: 1,239,196; 3,269,742; 1,330,644; 3,154,312; 2,382,335; 3,782,744; 2,392,098; 3,782,745.

Other relevant prior art is generally known as "skateboards" for use on hard surfaces, i.e. asphalt, concrete, etc., which include freely rotatable wheels fixed to the underside of the board and permit easy rolling movement over these surfaces especially when going downhill. This movement is substantially restricted if not completely eliminated when the hard surface is covered with packed snow, thereby effectively restricting the normal recreational enjoyment obtained from the skateboard.

SUMMARY OF THE INVENTION

The present invention comprises a device for use on snow laden or covered surfaces which operates on the same general principle as a skateboard and is commonly termed herein as a snowboard. This board basically comprises an elongated main body which has laterally or transversely disposed skis or runners mounted in pairs to the underside of the body at the front and rear thereof. These runners are coupled in parallel by transverse members and can be provided with stabilizer fins centrally located on the bottom of each runner for contact with the snow.

Accordingly, it is an object of this invention to provide a novel and improved relatively simple and economical recreational device for surfing on snow surfaces.

The foregoing and other objects, features and advantages of the invention will be apparent from the following description of the preferred embodiment of the invention when taken in conjunction with the accompanying drawings.

DESCRIPTION OF THE PREFERRED EMBODIMENT

Figure 1:
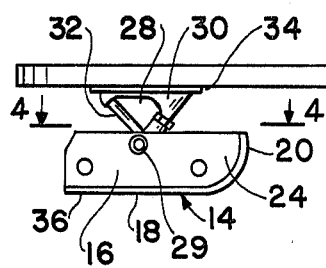
FIG. 1 is a side elevational view of a snowboard constructed according to the present invention.
Figure 1:
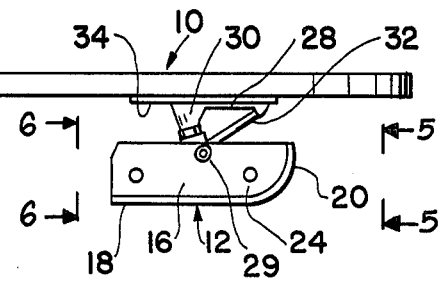
Figure 2:
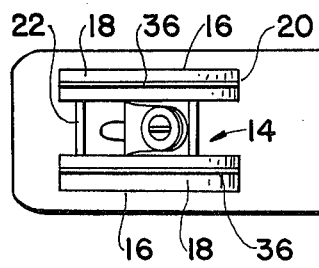
FIG. 2 is a bottom plan view of the snowboard of FIG. 1.
Figure 2:
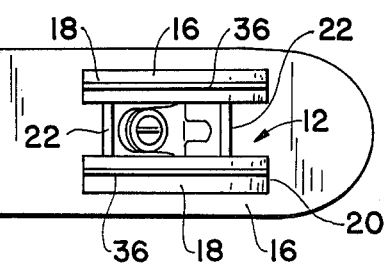
Figure 3:
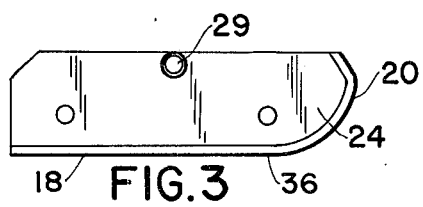
FIG. 3 is an enlarged side elevational view of a runner used in the invention of FIG. 1.
Figure 5:
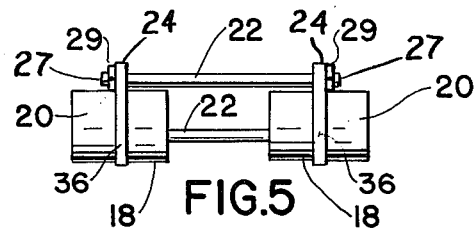
FIG. 5 is a view taken along the line 5—5 of FIG. 1.
Figure 4:
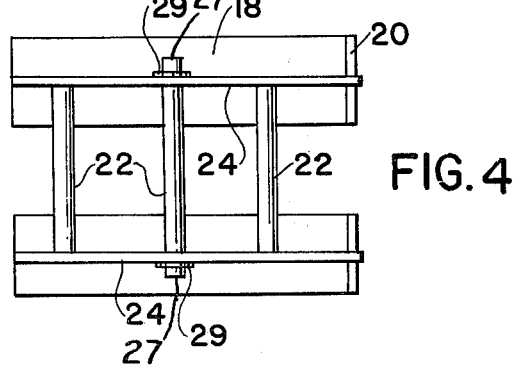
FIG. 4 is an enlarged top plan view as seen along the line 4—4 of FIG. 1.
Figure 6:
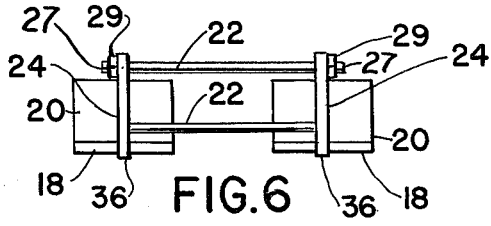
FIG. 6 is a view taken along the line 6—6 of FIG. 1.
Figure 8:
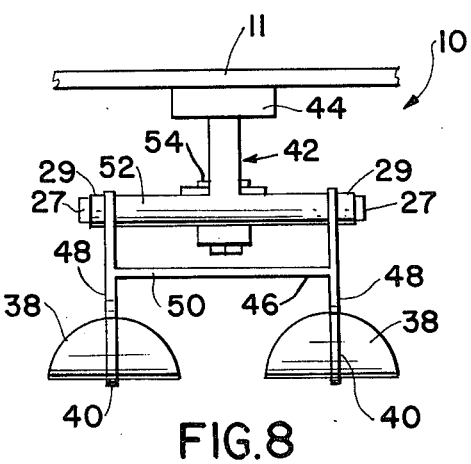
FIG. 8 is a fractionated front view of the alternate embodiment of FIG. 7.

Referring to the drawing wherein like parts are designated by the same reference numeral throughout the several views there is shown in FIG. 1 a recreational device termed herein as a "snowboard" and generally designated 10 constructed and arranged according to the present invention. The board has an elongated and relatively narrow continuous, single piece, main body 11 being similar to a "skateboard", and can be made of a rigid plastic or wood material. On the bottom of the board are axially spaced pairs of skis or runners 12, 14 situated at or near the front and rear of the board. Each pair includes laterally spaced runners 16 each of which comprises a smooth flat bottom or snow contact surface 18 and an upward curved portion 20 at the front or leading end of the runner. In the embodiment of FIGS. 1 through 6 the skis or runners employed are relatively small in order to permit easy balancing and manipulation of the board, and also use in all areas (i.e., country, city, etc.). The runners are symmetrically located on opposite sides of the board's longitudinal axis and are coupled together in parallel relation by transverse bars 22 at spaced locations along the length of the runners. The bars are suitably connected to centrally located upstanding supports 24, integrally provided by the runners, by welding, bolts, etc. The middle transverse bar 22 is vertically offset above the front and rear bars 22 and is connected at opposite ends to the portion 24 of each runner by means of bolts 27 (see FIG. 8) threaded into opposite ends of middle bar 22 and nuts 29 or only nuts threaded onto opposite threaded ends of the central bar 22. Secured to the middle bar 22 is a bracket 28 (similar to that used for skateboards) which includes a rigid portion 30 and a relatively flexible member 32. The upper end of the bracket has a mounting plate 34 secured to the underside of the board. The flexible member 32 is situated at the forward end of the runner whereas the rear bracket is reversed so that the flexible member faces the rear of the runner. The rigid portion 30 provides an adequate connection between the board and each pair of runners, while the flexible (or resilient) members permit limited maneuverability of the board and also absorb forces exerted during operations of the board. The runners are disconnected from bracket 28 by removing the threaded bolts 27 (see FIG. 8) and/or associated nuts 29 threaded onto the bolts on opposite threaded ends of the bar per the embodiment of FIGS. 1–6. Each runner preferably includes a central fin 36 on its underside which will help stabilize the board when used for snow surfing. The runners can be made of plastic, metal or other sufficiently strong material. By designing the runner pairs so that they can be disconnected easily from the board it is possible to similarly design skates for securement to the same bracket, thereby expanding the utility of the board for winter as well as other seasons.

According to a preferred mode of operation the board is used by placing it at the top of a hill which preferably is packed hard with snow. The operator stands on the board and pushes off, whereupon both feet are placed on the board, being located similar to their location on a "skateboard." As the board slides over the snow proceeding downhill, the operator may lean to either side in order to manipulate the board in a preferred direction. The resilient connection will aid in manipulation of the board by the operator.

Figure 7:
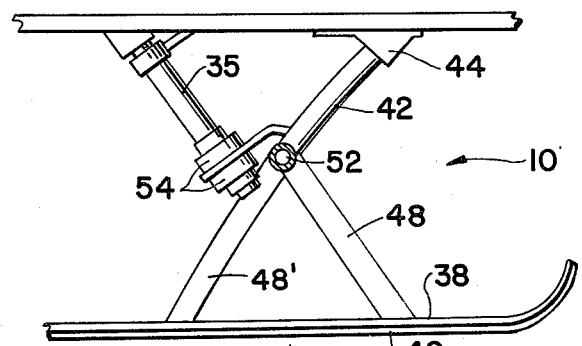
FIG. 7 is a partial side elevational of an alternate embodiment of the present invention.

If the snow is lightly packed and the small skis or runners of FIGS. 1 through 6 will not work satisfactorily, a larger pair of skis 38 (see FIGS. 7 and 8) can be used instead of the small runners. The basic arrangement is similar to that described heretofore for the runners of FIGS. 1 through 6 in that laterally-spaced skis are mounted to the underside of the board at the front and rear (not shown) of the board. Each ski 38 is conventional in shape and also includes a stabilizer fin 40 centrally disposed along its longitudinal axis on the bottom surface. The skis are mounted to the board in a preferred embodiment by an inverted angularly oriented T-shaped support 42 secured at its upper end to a mounting bracket 44 fastened to the board and at its opposite bottom end to the skis at a location situated rearward of the upper connection. An H-shaped brace 46 having transversely spaced vertical members 48 interconnected by a horizontal member 50 provides a forward support for the support 42. Another member 48' (identical with 48) also aids in support of 42 but in a backward direction and is connected to the transverse bar 52 as shown. The brace is angularly disposed with respect to the ski and has the upper end of its vertical members connected with the transverse bar 52 of support 42. A solid member 35 is coupled through resilient rubber pieces 54 between the board and support 42 substantially at its midpoint. This aids the operator when using the snowboard and facilitates manipulation of the board. The rear pair of skis are mounted and arranged similar to the front pair of skis with the rear brace in the reverse position as shown in the embodiment of FIG. 1.

The foregoing embodiments of the present invention are by way of illustration of the invention, and other embodiments and modifications which do not depart from the spirit of the invention are intended to be included within the scope of the appended claims.

What is claimed is:

1. In a snow surfboard comprising a single continuous elongated main body having secured thereto, on its underside at the front and rear thereof, a first and second pair of snow skis for contact with a snow-laden surface wherein each ski of each pair is parallel to the other, the improvement which comprises said first and second pair of skis secured to said main body by securing means wherein each securing means is comprised of an inverted angularly oriented T-shaped support means secured at its upper vertical end to a mounting bracket fastened to said main body and at its opposite end to a brace comprised of two H shaped members having transversely spaced members substantially vertical to said main body and interconnected at the midpoint of said transversely spaced members by members substantially horizontal to said main body thereby providing support and attachment for said T-shaped support means at their upper end and attached to said first or second pair of skis at their lower end wherein a solid member is coupled through resiliant means between said main body and said inverted T-shaped support means, said solid means being attached substantially at the midpoint of the horizontal member of said inverted T-shaped member at one end and extending angularly upward and backward and attached to said main body at its other end.

2. The snow surfboard of claim 1 wherein each pair of skis includes a stabilizer fin centrally disposed along the longitudinal axis of the bottom surface of each ski.

* * * * *